United States Patent
Li et al.

(10) Patent No.: US 11,010,661 B2
(45) Date of Patent: May 18, 2021

(54) NEURAL NETWORK CHIP, METHOD OF USING NEURAL NETWORK CHIP TO IMPLEMENT DE-CONVOLUTION OPERATION, ELECTRONIC DEVICE, AND COMPUTER READABLE STORAGE MEDIUM

(71) Applicant: SHENZHEN INTELLIFUSION TECHNOLOGIES CO., LTD., Shenzhen (CN)

(72) Inventors: Wei Li, Shenzhen (CN); Qingxin Cao, Shenzhen (CN); Lea Hwang Lee, Shenzhen (CN)

(73) Assignee: SHENZHEN INTELLIFUSION TECHNOLOGIES CO., LTD., Shenzhen (CN)

( * ) Notice: Subject to any disclaimer, the term of this patent is extended or adjusted under 35 U.S.C. 154(b) by 36 days.

(21) Appl. No.: 16/627,767

(22) PCT Filed: Mar. 16, 2018

(86) PCT No.: PCT/CN2018/079374
§ 371 (c)(1),
(2) Date: Dec. 31, 2019

(87) PCT Pub. No.: WO2019/127927
PCT Pub. Date: Jul. 4, 2019

(65) Prior Publication Data
US 2020/0380345 A1    Dec. 3, 2020

(30) Foreign Application Priority Data
Dec. 29, 2017 (CN) .......................... 201711484228.2

(51) Int. Cl.
*G06N 3/063* (2006.01)
*G06N 3/04* (2006.01)
*G06F 17/15* (2006.01)

(52) U.S. Cl.
CPC ............... *G06N 3/063* (2013.01); *G06N 3/04* (2013.01); *G06F 17/15* (2013.01)

(58) Field of Classification Search
None
See application file for complete search history.

(56) References Cited

U.S. PATENT DOCUMENTS 5,870,085 A * 2/1999 Laksono ................. G09G 5/393
345/551
10,460,416 B1 * 10/2019 Sirasao ...................... G06T 1/20
(Continued)

FOREIGN PATENT DOCUMENTS

CN    104899610 A    9/2015
CN    105551036 A    5/2016
(Continued)

OTHER PUBLICATIONS

Lu, L. et al. (May 2017). "Evaluating fast algorithms for convolutional neural networks on FPGAs." 2017 IEEE 25th Annual International Symposium on Field-Programmable Custom Computing Machines (FCCM). IEEE, 2017. DOI: 10.1109/FCCM.2017.64 (Year: 2017).*
(Continued)

*Primary Examiner* — Kamran Afshar
*Assistant Examiner* — Benjamin J Buss

(57) ABSTRACT

A neural network chip and a related product are provided. The neural network chip (103) includes: a memory (102), a data reading/writing circuit, a convolution calculation circuit, wherein the memory is used for storing a feature map; the data reading/writing circuit is used for reading the
(Continued)

Reading a feature map from the memory and performing an expansion zero operation on the feature map, according to configuration information of the feature map, to obtain a final padded result — S401

Performing convolution calculation on the final paddded result to implement a de-convolution operation — S402 feature map from the memory and execute an expansion and zero-padding operation on the feature according to configuration information of the feature map, and sending to the convolution calculation circuit (S401); and the convolution calculation circuit is used for performing convolution calculation on the data obtained after the expansion and zero-padding operation to implement a de-convolution operation (S402). The technical solution has advantages of saving memory usage and bandwidth.

4 Claims, 4 Drawing Sheets

(56) References Cited

U.S. PATENT DOCUMENTS

| | | | | |
|---|---|---|---|---|
| 2018/0189643 | A1* | 7/2018 | Kim | G06F 17/153 |
| 2019/0074849 | A1* | 3/2019 | Zhu | H04L 1/0041 |
| 2019/0370692 | A1* | 12/2019 | Cho | G06N 3/063 |
| 2020/0336273 | A1* | 10/2020 | Ovsiannikov | G06F 9/3818 |
| 2021/0049463 | A1* | 2/2021 | Ruff | G06N 3/04 |

FOREIGN PATENT DOCUMENTS

| | | |
|---|---|---|
| CN | 106548201 A | 3/2017 |
| CN | 106611420 A | 5/2017 |

OTHER PUBLICATIONS

Ball, J.E. et al. (Sep. 2017). "Comprehensive survey of deep learning in remote sensing: theories, tools, and challenges for the community". Journal of Applied Remote Sensing, 11(4), 042609. DOI:10.1117/1.JRS.11.042609 (Year: 2017).*

Liu, S. et al. (Dec. 2018). "Optimizing CNN-based segmentation with deeply customized convolutional and deconvolutional architectures on FPGA." ACM Transactions on Reconfigurable Technology and Systems (TRETS) 11.3 (2018): 1-22. DOI:10.1145/3242900 (Year: 2018).*

International Search Report issued in corresponding International application No. PCT/CN2018/079374, dated Sep. 27, 2018.

Written Opinion of the International Searching Authority for No. PCT/CN2018/079374, dated Sep. 27, 2018.

Initial Publication for PCT/CN2018/079374.

\* cited by examiner

NEURAL NETWORK CHIP, METHOD OF USING NEURAL NETWORK CHIP TO IMPLEMENT DE-CONVOLUTION OPERATION, ELECTRONIC DEVICE, AND COMPUTER READABLE STORAGE MEDIUM

CROSS-REFERENCE TO RELATED APPLICATION

This application claims the benefit of priority from Chinese Patent Application No. 201711484228.2 entitled "NEURAL NETWORK CHIP, METHOD OF USING NEURAL NETWORK CHIP TO IMPLEMENT DE-CONVOLUTION OPERATION, ELECTRONIC DEVICE, AND COMPUTER READABLE STORAGE MEDIUM" and filed on Dec. 29, 2017, the content of which is hereby incorporated by reference in its entire by reference.

BACKGROUND

Technical Field

The present disclosure generally relates to artificial intelligence (AI) technology field, and especially relates to a neural network chip, a method of using a neural network chip to implement a de-convolution operation, an electronic device, and a computer readable storage medium.

Description of Related Art

Nowadays, with the development of artificial intelligence technology, it is applied in more and more fields. A conventional way of using software to implement artificial intelligence algorithms has been unable to meet requirements of some high-demand scenarios. Therefore, artificial intelligence (AI) algorithms must be implemented and accelerated with specific hardware, which requires the hardware to support as many of basic operations of artificial intelligence (AI) algorithms as possible, including one called de-convolution.

De-convolution operation requires for performing a zero-padding and expansion operation on feature maps according to specific rules. The conventional way, by using software, to implement the zero-padding and expansion operation is inefficient, and data after being expanded is needed to be stored in the memory, which can take up a lot of storage space and simultaneously increase usage of system bandwidth.

SUMMARY

The technical problems to be solved: in view of the shortcomings of the related art, the present disclosure relates to a neural network chip, a method of using a neural network chip to implement a de-convolution operation, an electronic device, and a computer readable storage medium which can perform an expansion and zero-padding operation on a feature map and send it directly to a corresponding convolution calculating unit for calculation after the feature map is expanded, thereby it can greatly improve the efficiency of de-convolution operation and save memory usage and system bandwidth.

In the first respect, a neural network chip according to an embodiment of the present disclosure includes a memory, a data reading circuit and a convolution calculating circuit, wherein the memory configured to store feature maps;

the data reading circuit configured to read the feature map from the memory, perform an expansion and zero-padding operation on the feature maps, to obtain padded feature maps, according to configuration information of the feature maps, and send the padded feature maps to the convolution calculating circuit; and the convolution calculating circuit configured to perform convolution calculation on data of the padded feature maps to implement a de-convolution operation.

Alternatively, the data reading circuit is configured to periodically read a set amount of data of the feature maps from the memory, perform the expansion and zero-padding operation on the set amount of data of the feature maps, to obtain the set amount of data of padded feature maps, and then input the set amount of data of the padded feature maps into the convolution calculating circuit; and the convolution calculating circuit is configured to perform the convolution calculation on the set amount of data of the padded feature maps.

Alternatively, the data reading circuit includes a data reading module, a first in first out command module, a command read control module, a first command buffer and a second command buffer, an input data first in first out module, a first data buffer and a second data buffer and an output data first in first out module;

the data reading module configured to send a read request of the feature maps to the memory to read the feature maps according to the configuration information of the feature maps, and send the configuration information of the feature maps to the first in first out command module;

the first in first out module configured to store the configuration information of the feature maps;

the input data first in first out module configured to store data of the feature maps when the data of the feature maps is transmitted from the memory to the data reading circuit;

the command read control module configured to decode the configuration information of the feature maps to obtain decoded information when the first in first out command module is detected non-empty, detect a status of the input data first in first out module, and read the data of the feature maps from the input data first in first out module and then store the data in the first command buffer, if the status of the input data first in first out module is non-empty; and store relevant decoded information corresponding to the feature maps in the first command buffer;

the command read control module configured to read m data from the first data buffer, perform a right-alignment operation on the m data to obtain second data, and store the second data after the alignment operation into the second data buffer, and then store second decoded information corresponding to the second data of the feature maps into the second command buffer, wherein m is a positive integer and less than the set amount;

the command read control module configured to perform a first direction a zero-padding and expansion operation on the second data in the second data buffer to obtain a first padded result, according to the second decoded information in the second command buffer, and then store the first padded result in the output data first in first out module; and the command read control module further configured to perform a second direction zero-padding and expansion operation on the first padded result to obtain a second padded result, according to the second decoded information, and then output the second padded result to the convolution calculating circuit.

Alternatively, the first direction is a horizontal direction and the second direction is a vertical direction;

or the first direction is a vertical direction and the second direction is a horizontal direction.

In the second respect, a method of using a neural network chip to implement a de-convolution operation is provided that the neural network chip includes a memory, a data reading circuit and a convolution calculating circuit, the method including:

reading a feature map from the memory and performing an expansion and zero-padding operation on the feature map, to obtain a padded feature map, according to configuration information of the feature map to obtain a final padded result; and performing convolution calculation on the final padded result to implement a de-convolution operation.

Alternatively, the step of reading a feature map from the memory including:

reading periodically a set amount of data of the feature map from the memory.

Alternatively, the data reading circuit includes a first in first out command module, an input data first in first out module, an output data first in first out module, a first data buffer and a second data buffer, and a first command buffer and a second command buffer; the step of performing an expansion and zero-padding operation on the feature map according to configuration information to obtain a final padded result, including:

sending a read request of the feature map to the memory to read the feature map according to the configuration information of the feature map, and sending the configuration information of the feature map to the first in first out command module for storage;

decoding the configuration information of the feature map to obtain decoded information when the first in first out command module is detected non-empty, detecting a status of the input data first in first out module, reading data of the feature map from the input data first in first out module and then storing the data of the feature map in the first command buffer, if the status of the input data first in first out module is non-empty; and storing the decoded information related to the feature map in the first command buffer;

reading m data from the first data buffer, performing a right-alignment operation on the m data to obtain second data, and storing the second data after the alignment operation into the second data buffer, and then storing second decoded information corresponding to the second data into the second command buffer, wherein m is a positive integer and less than the set amount;

performing a first direction zero-padding and expansion operation on the second data in the second data buffer to obtain a first padded result, according to the second decoded information in the second command buffer, and then storing the first padded result in the output data first in first out module; and performing a second direction zero-padding and expansion operation on the first padded result, according to the second decoded information, so as to obtain the final padded result.

Alternatively, the first direction is a horizontal direction and the second direction is a vertical direction;

or the first direction is a vertical direction and the second direction is a horizontal direction.

In the third respect, an electronic device according to an embodiment of the present disclosure includes a neural network chip provided in the first respect.

In the fourth respect, a computer readable storage medium is provided for storing computer programs for electronic data interchange performed by a computer to implement the method provided in the second respect.

In the fifth respect, a computer program product is provided for including a non-transient computer readable storage medium storing computer programs performed by a computer to implement the method provided in the second respect.

The present disclosure provides the advantages as below.

It can be seen that the technical scheme provided in the present disclosure can automatically perform an expansion and zero-padding operation on feature maps according to configuration information, and a data reading circuit is added to directly extract data from the feature map and then perform the expansion and zero-padding operation on it, finally send the data obtained after the expansion and zero-padding operation to a convolution calculating circuit to perform convolution calculation on the data. Therefore, it can't need to store intermediate data in the memory, which can save memory usage and system bandwidth, and further improve the efficiency of a de-convolution operation by adding the hardware modules.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described embodiment of the present disclosure, all other embodiments obtained by one of ordinary skill in the related art on the premise of no creative work are within the protection scope of the present disclosure.

In the description of the present disclosure, the terms "first", "second", "third" and "fourth" shown in the specification, claims and attached drawings are only used to distinguish different objects, but not indicated that the elements of the present disclosure is important or represented as particular orders. In addition, the terms "include", "have" and any variation thereof are intended to cover non-exclusive inclusions. For example, a process, a method, a system, a product, or a device including a series of steps or units is not limited to its listed steps or units, but can optionally include steps or units without being listed, or other steps or units that are inherent to these processes, methods, products, or devices.

In the description of the present disclosure, the references to "an embodiment", "some embodiments" etc mean to specific characteristics, structures or characters described in the embodiments or examples in particular combinations should be contained in at least one embodiment or example of the present disclosure. A schematic description of the above references does not necessarily refer to the same embodiment or example, also does not refer to the embodiments that are independent and exclusive embodiments with other embodiments or alternative embodiments. It can be understood both explicitly and implicitly by one of ordinary skill in the related art that the embodiments described herein can be combined in an appropriate manner in any one or more embodiments or examples.

An electronic device of the present disclosure can include servers, smart camera devices, smart phones (such as Android phones, iOS Pphones, Windows phones etc), tablet computers, PDAs, laptops, Mobile Internet Devices (MIDs), or wearable devices etc, such electronic devices mentioned above are only as examples, not exhaustive, can include, but not limited to, them. For convenient descriptions, the electronic device in the following embodiments is referred as user equipment (UE), a terminal, or an electronic device. Of course, in practical applications, the above-mentioned user equipment is not limited to the above implementation forms, for example, it can also include: intelligent vehicle terminals, computer equipments etc.

Figure 1:
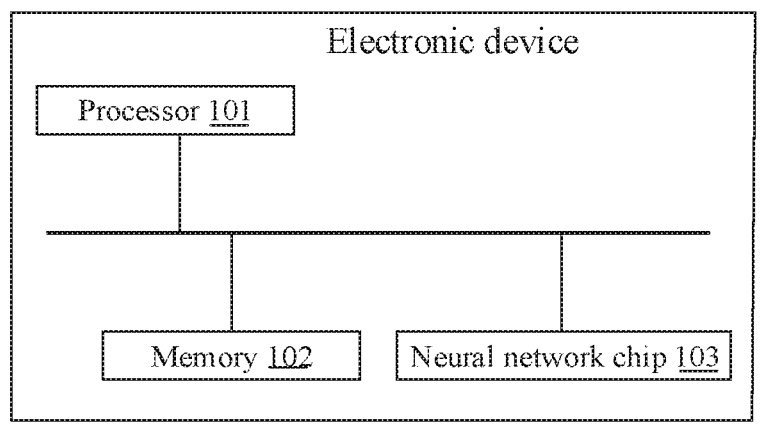
FIG. 1 is a block diagram of an electronic device in accordance with an exemplary embodiment of the present disclosure.

For the above electronic device, its structure is shown in FIG. 1. Specifically, the electronic device can include: a processor 101, a memory 102 and a neural network chip 103, all the processor 101, the memory 102 and the neural network chip 103 are connected to each other, in a specifically alternative embodiment of the present disclosure, the neural network chip 103 can be integrated into the processor 101. The memory 102 can include: flash disks, Read-Only Memories (ROMs), Random Access Memories (RAMs), etc. The technical scheme of the present disclosure is not limited to whether the above mentioned neural network chip 103 is set up separately or integrated in the processor 101.

Figure 2:
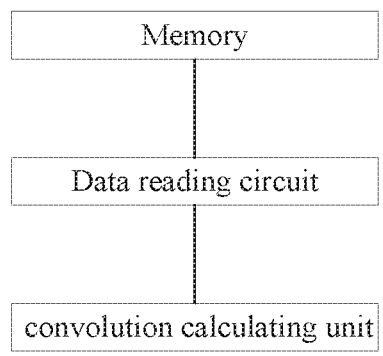
FIG. 2 is a block diagram of a neural network chip of the electronic device of FIG. 1.

Referring to FIG. 2, it is a block diagram of the neural network chip disclosed in the present disclosure. The neural network chip can include: a memory, a data reading circuit and a convolution calculating circuit, a data reading module configured to read data of feature maps from the memory, and perform an expansion and zero-padding operation on the data of the feature maps, to obtain padded feature maps, according to configuration information, and then send the padded feature maps to the convolution calculating circuit for performing convolution calculation on the padded feature maps to implement a de-convolution operation. The data reading circuit is configured to read a set amount of data from the memory per cycle, and guarantee the set amount of data to be sent to the convolution calculating circuit for calculation per cycle, after the set amount of data is performed the expansion and zero-padding operation.

Figure 3:
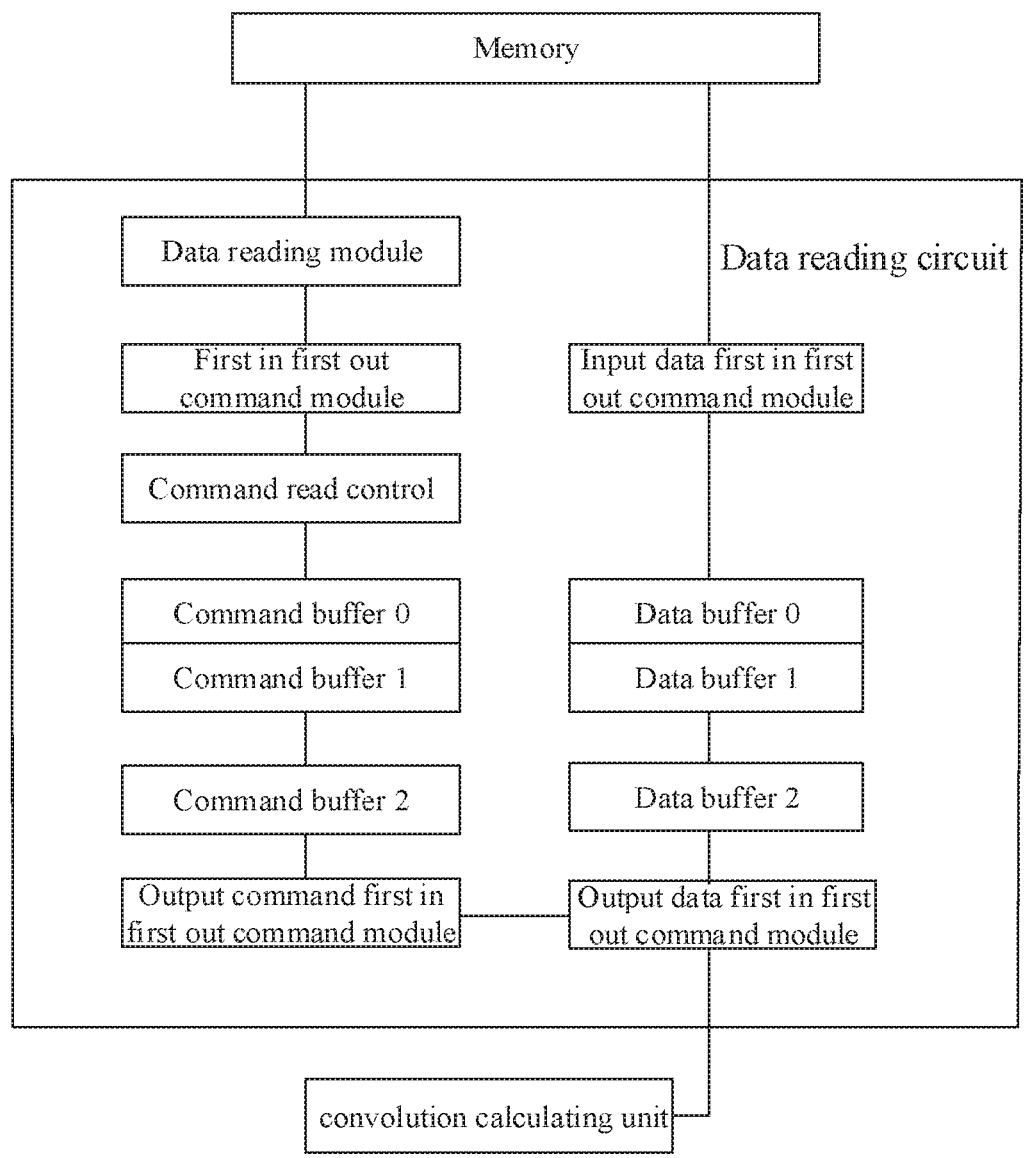
FIG. 3 is a block diagram of a data reading circuit of the neural network chip of FIG. 2 disclosed in the present disclosure.

Referring to FIG. 3, it is shown hardware architecture of the whole data reading circuit, the process of read data and perform an expansion operation by the data reading circuit is as follows:

the data reading module is first configured to decode the configuration information and send a read request of each feature map to the memory, according to the decoded information (specifically, according to the specification of the feature map, it can be possible to read back all the feature maps through sending one or more read requests). The configuration information required by the data reading module includes, but not limited to: the specification (width and height) of the feature map, the number of feature maps, and the way to perform a zero-padding and expansion operation on the feature map. Furthermore, the way to perform an zero-padding and expansion operation on the feature map includes, but not limited to: the first row of the feature map is preceded by several rows of zeros, and the last row is followed by several rows of zeros; while, the first column is preceded by several columns of zeros, the last column is followed by several columns of zeros, and each row is followed by several zeros for each data.

After the data reading module sending the read request of the feature map to the memory, the configuration information of each feature map is needed to be stored in the first in first out command module. When the data of the feature map is transmitted from the memory to a data carrying unit (the data reading circuit), the data can be stored in the input data first in first out module, the number of data stored in the input data first in first out module per cycle is the set amount (for convenient illustration, taking the set amount=28 as an example, of course, in practical applications, other values can be taken, such as 29, 30, 26, 27 etc).

When the first in first out command module is detected non-empty by a command read control logic, the configuration information of the feature map stored in the first in first out command module can be read and then decoded, and the status of the input data first in first out module is further detected, if the status of the input data first in first out module is non-empty, it means that the data of the feature map is been read back from the memory to the data reading circuit. At this time, the data in the input data first-in first-out module can be read and stored in a data buffer 0 or a data buffer 1, and relevant decoded information corresponding to the feature map can be simultaneously stored in a command buffer 0 and a command buffer 1. The relevant decoded information of the feature map includes: ways to perform a zero-padding and expansion operation on the data in the data buffer 0/1, and position information of the data of the feature map in the data buffer 0/1.

Both the data buffer 0 and the data buffer 1 are two ping-pong buffers, and the relevant decoded information corresponding to their respective feature map is stored in the command buffer 0 and the command buffer 1, respectively.

Once the data in the data buffer 0 and the data buffer 1 is ready, the data in the data buffer 0 and the data buffer 1 can be read and aligned according to information of the command buffer 0 and the command buffer 1. The reason for performing the alignment operation is that only 28 data need to be provided to the convolution calculating circuit per cycle after the data is expanded, so, it is not necessary to extract 28 data from the data buffer 0 and the data buffer 1 per cycle. It can be assumed that m data are read from the data buffer 0/1 per cycle, and the m data can be located anywhere in the data buffer 0/1, thereby it's needed to perform a right-alignment operation on the m data. The selection of m can be calculated in advance according to specific requirements of performing the zero-padding and expansion operation on each feature map, it can ensure that pipe-line isn't interrupted as long as 28 data can be provided per cycle after the data is expanded.

After the alignment operation is completed, the data can be stored in a data buffer 2, and at the same time, feature map information corresponding to the data can be stored in a command buffer 2 to prepare for performing a zero-padding and expansion operation in the horizontal direction.

Once the data in the data buffer 2 is ready, it can perform the zero-padding and expansion operation on the data in the horizontal direction according to zero-padding and expansion information of the feature map stored in the command buffer 2 and the position information of the data of the feature map stored in the data buffer 2. A result after performing the zero-padding and expansion operation on the data in the horizontal direction can be stored in the output data first in first out module. At the same time, before performing the zero-padding and expansion operation on each feature map in the horizontal direction, the feature map information corresponding to each feature map can be stored in the output data first in first out module.

When the first in first out command module is non-empty, the relevant information of the feature map can be first read from the first in first out command module, and the data in the output data first in first out module can be read according to the relevant information of the feature map and then the zero-padding and expansion operation in the vertical direction can be performed on the data, and finally the final result can be sent to the convolution calculating circuit.

It can be seen that the technical scheme provided in the present disclosure can automatically perform an expansion and zero-padding operation on feature maps, to obtain padded feature maps, according to configuration information, and a data reading circuit is added to directly extract data from the feature maps and then perform the expansion and zero-padding operation on it, to obtain the padded feature maps, finally send the padded feature maps to a convolution calculating circuit to perform convolution calculation on the padded feature maps. Therefore, it can't need to store intermediate data in the memory, which can save memory usage and system bandwidth, and further improve the efficiency of a de-convolution operation by adding the hardware modules.

Figure 4:
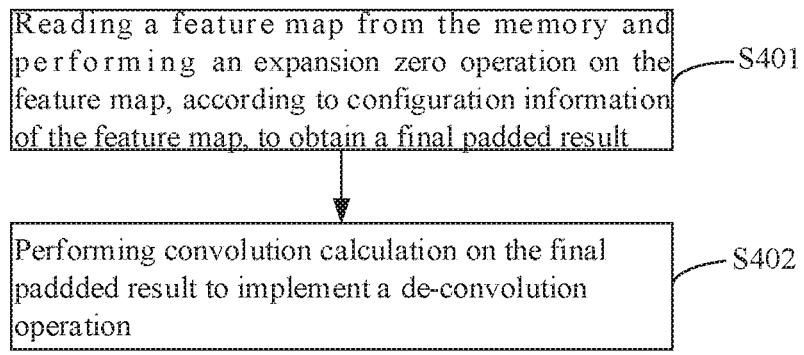
FIG. 4 is a flowchart of a method of using a neural network chip to implement a de-convolution operation in accordance with an embodiment of the present disclosure.
Figure 4A:
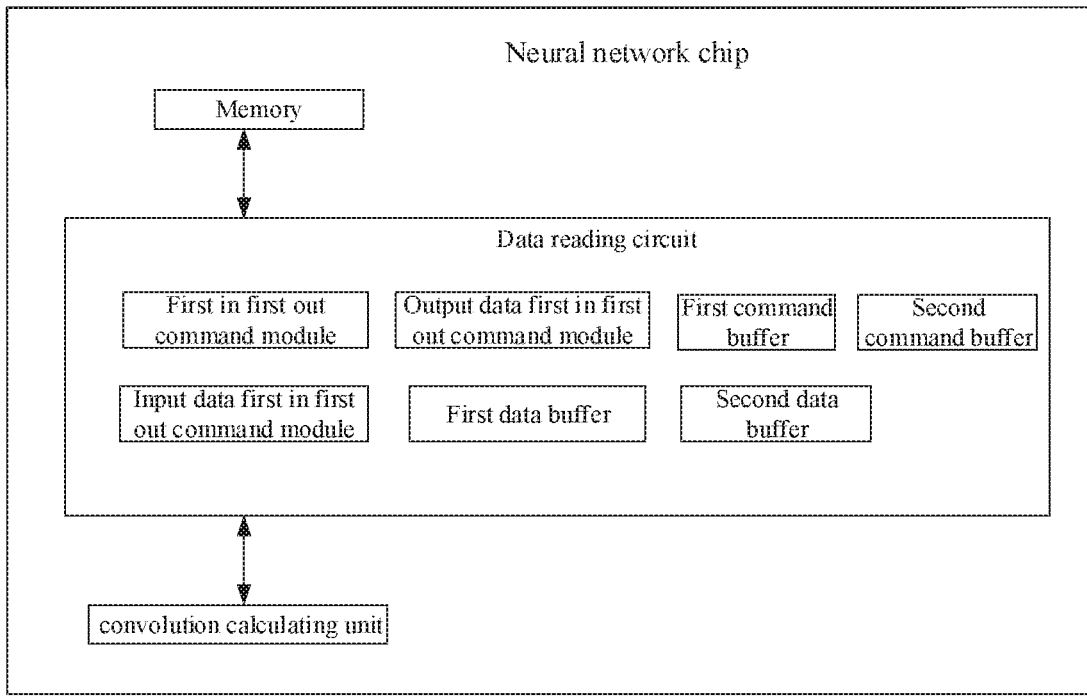
FIG. 4a is a block diagram of a neural network chip in accordance with an embodiment in accordance with an embodiment of the present disclosure.

Referring to FIG. 4, a method of using a neural network chip to implement a de-convolution operation is provided, the neural network chip shown in FIG. 4a, includes: a memory, a data reading circuit and a convolution calculating circuit. The method includes the following steps:

S401, reading a feature map from the memory and performing an expansion and zero-padding operation on the feature map, according to configuration information, to obtain a final padded result; and S402, performing convolution calculation on the final padded result to implement a de-convolution operation.

Alternatively, the step of reading a feature map from the memory includes:

reading periodically a set amount of data of the feature map from the memory.

Alternatively, the data reading circuit further includes a first in first out command module, an input data first in first out module, an output data first in first out module, a first data buffer, a second data buffer, a first command buffer and a second command buffer; the step of performing an expansion and zero-padding operation on the feature map, according to configuration information, to obtain a final padded result, includes:

sending a read request of the feature map to the memory to read the feature map according to the configuration information of the feature map, and sending the configuration information of the feature map to the first in first out command module for storage;

decoding the configuration information of the feature map to obtain decoded information when the first in first out command module is detected non-empty, detecting a status of the input data first in first out module, reading data of the feature map from the input data first in first out module and then storing the data of the feature map in the first command buffer, if the status of the input data first in first out module is non-empty; and storing the decoded information related to the feature map in the first command buffer;

reading m data from the first data buffer, performing a right-alignment operation on the m data to obtain second data, and storing the second data after the alignment operation into the second data buffer, and then storing second decoded information corresponding to the second data into the second command buffer, wherein m is a positive integer and less than the set amount;

performing a first direction zero-padding and expansion operation on the second data in the second data buffer to obtain a first padded result, according to the second decoded information in the second command buffer, and then storing the first padded result in the output data first in first out module; and performing a second direction zero-padding and expansion operation on the first padded result, according to the second decoded information, so as to obtain the final padded result.

Alternatively, the first direction is a horizontal direction and the second direction is a vertical direction;

or the first direction is a vertical direction and the second direction is a horizontal direction.

Figure 5:
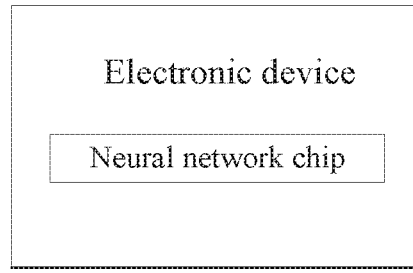
FIG. 5 is a block diagram of the electronic device in accordance with another embodiment in accordance with an embodiment of the present disclosure.

Referring to FIG. 5, an electronic device according to an embodiment of the present disclosure includes the neural network chip mentioned above.

A computer readable storage medium according to an embodiment of the present disclosure is provided. The computer readable storage medium is configured to store computer programs for electronic data interchange performed by a computer to implement part or all of the steps of any method of using the neural network chip to implement a de-convolution operation which is described in embodiments of the present disclosure.

A computer program product according to an embodiment of the present disclosure includes a non-transient computer readable storage medium. The non-transient computer readable storage medium is configured to store computer programs performed by a computer to implement part or all of the steps of any method of using the neural network chip to implement a de-convolution operation which is described in embodiments of the present disclosure.

It should be noted that, for the sake of simple description, each embodiment of the above method is expressed as a series of action combinations, however, for one of ordinary skill in the related art, the present disclosure can't be restricted by its sequence of the description, as some steps can be simultaneously performed or in other orders according to the present disclosure. Furthermore, it can be understood, for one of ordinary skill in the related art, that embodiments or examples in the description is alternative exemplary embodiments or examples, and actions and modules involved are not necessarily required for the present disclosure.

In the above embodiments, the description of each embodiment has its own emphasis, and parts without detailed description in one embodiment can be referred to relevant description of other embodiments.

In some exemplary embodiments of the present disclosure, it can be understood that the disclosed devices can be implemented via other ways. For example, the device of the embodiment described above is only a schematic description, for example, the partition of the units is only a logical function partition, which can be implemented via another way, for example, a plurality of units or components can be combined or integrated into another system, or some features can be ignored or not implemented. On the other hand, coupling or direct coupling or communication connection between them shown or discussed can be indirect coupling or communication connection through some interfaces, devices or units, which can be electrical ways or otherwise.

The units described as separation parts can or can't be physically separated, and the parts displayed as modules can or can't be physical units, that is, they can be located in one place, or can be distributed on a plurality of network units. Some or all of the units can be selected according to actual needs to implement the purpose of the present disclosure.

In addition, the functional units in each embodiment of the present disclosure can be integrated in a processing unit, or each unit can be separately formed with a physical form, or two or more units can be integrated in one unit. The above integrated units can be implemented either in a hardware form or in the form of hardware plus software function modules.

The integrated units can be stored in a computer readable memory if implemented in the form of software program modules and sold or used as a separate product. Based on this understanding, the technical scheme of the present disclosure is essentially or part of the contribution to the related art or all or part of the technical scheme implemented as the form of software products, such computer software product can be stored in a memory and includes a plurality of instructions performed, by a computer device (which can be a personal computer, a server, a network device, etc) to implement all or part of steps of the method described in each embodiment of the present disclosure. The aforementioned memory includes: U disks, ROMs (Read-Only memories), RAMs (Random Access memories), hard disks, disks or CDs, and other mediums for storing program codes.

It is obvious to one of ordinary skill in the related art that all or part of the steps in the various methods of the above embodiments can be implemented by program instructions of relevant hardware which can be stored in a computer readable memory, and the memory can include flash disks, Read-Only Memories (ROMs), Random Access Memories (RAMs), disks, or CDs.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

The invention claimed is:

1. A neural network chip comprising:
    a memory configured to store feature maps;
    a data reading circuit configured to read the feature maps from the memory, perform an expansion and zero-padding operation on the feature maps, to obtain padded feature maps, according to configuration information of the feature maps, and send the padded feature maps to a convolution calculating circuit;
    the convolution calculating circuit configured to perform convolution calculation on data of the padded maps to implement a de-convolution operation; and wherein
    the data reading circuit comprises a data reading module, a first in first out command module, a command read control module, a first command buffer and a second command buffer, an input data first in first out module, a first data buffer, a second data buffer and an output data first in first out module;
    the data reading module configured to send a read request of the feature maps to the memory to read the feature maps according to the configuration information of the feature maps, and send the configuration information of the feature maps to the first in first out command module;
    the first in first out module configured to store the configuration information of the feature maps;
    the input data first in first out module configured to store data of the feature maps when the data of the feature maps is transmitted from the memory to the data reading circuit;
    the command read control module configured to decode the configuration information of the feature maps to obtain decoded information when the first in first out command module is detected non-empty, detect a status of the input data first in first out module, and read the data of the feature maps from the input data first in first out module and then store the data of the feature maps in the first command buffer, if the status of the input data first in first out module is non-empty; and store relevant decoded information corresponding to the feature maps in the first command buffer;
    the command read control module configured to read m data from the first data buffer, perform a right-alignment operation on the m data to obtain second data, and store the second data after the alignment operation into the second data buffer, and then store second decoded information corresponding to the second data of the feature maps into the second command buffer, wherein m is a positive integer and less than the set amount;
    the command read control module configured to perform a first direction zero-padding and expansion operation on the second data in the second data buffer to obtain a first padded result, according to the second decoded information in the second command buffer, and then store the first padded result in the output data first in first out module; and
    the command read control module further configured to perform a second direction zero-padding and expansion operation on the first padded result to obtain a second padded result, according to the second decoded information, and then output the second padded result to the convolution calculating circuit.

2. The neural network chip as claimed in claim 1, wherein the first direction is a horizontal direction and the second direction is a vertical direction, or the first direction is a vertical direction and the second direction is a horizontal direction.

3. A method of using a neural network chip to implement de-convolution operation, with the neural network chip comprising a memory, a data reading circuit and a convolution calculating circuit, comprising:

reading a feature map from the memory and performing an expansion and zero-padding operation on the feature map, according to configuration information of the feature map, to obtain a final padded result; and performing convolution calculation on the final padded result to implement a de-convolution operation; and wherein the data reading circuit comprises a first in first out command module, an input data first in first out module, an output data first in first out module, a first data buffer and a second data buffer, and a first command buffer and a second command buffer; the step of performing an expansion and zero-padding operation on the feature map, according to configuration information to obtain a final padded result, comprising:

sending a read request of the feature map to the memory to read the feature map, according to the configuration information of the feature map, and sending the configuration information of the feature map to the first in first out command module for storage;

decoding the configuration information of the feature map to obtain decoded information when the first in first out command module is detected non-empty, detecting a status of the input data first in first out module, reading the data of the feature map from the input data first in first out module and then storing the data of the feature map in the first command buffer, if the status of the input data first in first out module is non-empty; and storing the decoded information related to the feature map in the first command buffer;

reading m data from the first data buffer, performing a right-alignment operation on the m data to obtain second data, and storing the second data after the alignment operation into the second data buffer, and then storing second decoded information corresponding to the second data into the second command buffer, wherein m is a positive integer and less than the set amount;

performing a first direction zero-padding and expansion operation on the second data in the second data buffer to obtain a first padded result, according to the second decoded information in the second command buffer, and then storing the first padded result in the output data first in first out module; and performing a second direction zero-padding and expansion operation on the first padded result, according to the second decoded information, so as to obtain the final padded result.

4. The method as claimed in claim 3, wherein the first direction is a horizontal direction and the second direction is a vertical direction, or the first direction is a vertical direction and the second direction is a horizontal direction.

\* \* \* \* \*